(12) United States Patent
Sayama et al.

(10) Patent No.: US 8,840,006 B2
(45) Date of Patent: Sep. 23, 2014

(54) FRICTION-STIR JOINING METHOD

(71) Applicants: Honda Motor Co., Ltd., Tokyo (JP); F-Tech Inc., Kuki (JP)

(72) Inventors: Mitsuru Sayama, Wako (JP); Keisuke Tsuta, Wako (JP); Tsutomu Kobayashi, Wako (JP); Shosuke Ohhama, Wako (JP); Tetsuya Miyahara, Wako (JP); Katsumi Komori, Tochigi (JP); Kazuhiro Sekine, Kazo (JP); Naoki Osada, Kazo (JP)

(73) Assignees: Honda Motor Co., Ltd., Tokyo (JP); F-Tech Inc., Saitama (JP)

( * ) Notice: Subject to any disclaimer, the term of this patent is extended or adjusted under 35 U.S.C. 154(b) by 0 days.

(21) Appl. No.: 14/030,328

(22) Filed: Sep. 18, 2013

(65) Prior Publication Data
US 2014/0076957 A1 Mar. 20, 2014

(30) Foreign Application Priority Data
Sep. 18, 2012 (JP) .................................. 2012-205017

(51) Int. Cl.
*B23K 20/12* (2006.01)

(52) U.S. Cl.
CPC ............. *B23K 20/1225* (2013.01); *B23K 20/12* (2013.01)
USPC ....................................... 228/112.1; 228/2.1

(58) Field of Classification Search
None
See application file for complete search history.

(56) References Cited

U.S. PATENT DOCUMENTS

| | | | |
|---|---|---|---|
| 2005/0035180 A1* | 2/2005 | Nishiguchi et al. | 228/112.1 |
| 2005/0120535 A1* | 6/2005 | Gendou et al. | 29/428 |
| 2005/0139640 A1* | 6/2005 | Kay | 228/112.1 |
| 2006/0013645 A1* | 1/2006 | Ilyushenko et al. | 403/270 |
| 2007/0241167 A1* | 10/2007 | Gendou et al. | 228/101 |
| 2008/0023527 A1* | 1/2008 | Brenninger et al. | 228/101 |
| 2008/0026247 A1* | 1/2008 | Nakagawa et al. | 428/649 |
| 2008/0067215 A1* | 3/2008 | Gendou | 228/112.1 |
| 2008/0173696 A1* | 7/2008 | Gendou et al. | 228/112.1 |
| 2009/0188968 A1* | 7/2009 | Marie | 228/112.1 |
| 2010/0096438 A1* | 4/2010 | Sato et al. | 228/114 |
| 2011/0308059 A1* | 12/2011 | Seo et al. | 29/428 |
| 2012/0052322 A1* | 3/2012 | Hatakeyama et al. | 428/650 |

(Continued)

FOREIGN PATENT DOCUMENTS

| | | | |
|---|---|---|---|
| JP | 2007-253172 A | * | 10/2007 |
| JP | 4436099 B2 | | 3/2010 |
| JP | 2012-152759 A | * | 8/2012 |
| WO | WO 2011/125376 A1 | * | 10/2011 |

*Primary Examiner* — Kiley Stoner
(74) *Attorney, Agent, or Firm* — Carrier Blackman & Associates, P.C.; William D. Blackman; Joseph P. Carrier (57) ABSTRACT

Disclosed is a friction-stir joining method for joining a first member, having a base metal covered with a substance different from the base metal, with a second member with the second member placed on the first member by moving a joining tool along a joining line having thereon a joining start point and a joining finish point. The method includes steps of: inserting the joining tool into the second member at the joining start point; moving the joining tool a predetermined distance along the joining line in a direction opposite the joining finish point; causing the joining tool to turn back at a turning-back point spaced the predetermined distance from the joining start point; moving the joining tool along the joining line to the joining finish point past the joining start point; and pulling the joining tool out from the second member at the joining finish point.

4 Claims, 6 Drawing Sheets

(56) References Cited

U.S. PATENT DOCUMENTS

| | | | |
|---|---|---|---|
| 2012/0125522 A1* | 5/2012 | Kato et al. | 156/73.5 |
| 2012/0202089 A1* | 8/2012 | Hangai et al. | 428/613 |
| 2012/0325897 A1* | 12/2012 | Sato et al. | 228/114 |
| 2013/0011183 A1* | 1/2013 | Yahaba et al. | 403/270 |
| 2013/0148689 A1* | 6/2013 | Yahaba et al. | 374/5 |
| 2013/0233910 A1* | 9/2013 | Sato et al. | 228/114 |
| 2013/0249250 A1* | 9/2013 | Ohhama et al. | 296/204 |
| 2014/0004375 A1* | 1/2014 | Yamauchi | 428/615 |

\* cited by examiner

FRICTION-STIR JOINING METHOD

FIELD OF THE INVENTION

The present invention relates to an improvement in a friction-stir joining method.

BACKGROUND OF THE INVENTION

A friction-stir joining is a process wherein a joining tool rotating at a high speed is brought into contact with workpieces or objects to join or weld together the same with resulting friction heat. In this method, there is a fear that a fatigue crack may develop in scars or remains left at a joining start point where the joining tool is placed against the to-be-joined workpieces and at a joining end point where the joining tool is removed from the to-be-joined workpieces.

An example solution to such a problem, namely, positioning a joining start point and a joining finish point away from a joining center line, is proposed in Japanese Patent No. 4436099. According to the proposed solution, a friction stir welding (FSW) start portion is selected at a position laterally spaced a predetermined distance from a joining start point on a joining center line, whereafter joining or welding is carried out from the selected FSW start portion all the way past a joining origin (joining start point) to a joining terminus (joining finish point). Since the joining origin is positioned away from the FSW start portion, there is no fear of a fatigue crack being developed at the joining origin.

In recent years, the to-be-joined workpieces are often plated or coated. Platings and coatings on the workpieces' mated surfaces (joined interface) bring about adverse effects on the resulting joining quality. Certain cases have been observed in which workpieces joined together in accordance with the proposed solution have joining defects at weld origins in the mated surfaces of the workpieces. Thus, there is a demand for an improved joining method that achieves sound joining of plated or coated to-be-joined workpieces, particularly at joining origins of the latter.

SUMMARY OF THE INVENTION

It is therefore an object of the present invention to provide an improved joining method that achieves sound joining of plated or coated to-be-joined workpieces, particularly at joining origins of the latter.

According to the present invention, there is provided a friction-stir joining method for joining a first member, having a base metal covered with a substance different from the base metal, with a second member after the second member is placed on the first member by moving a joining tool along a joining line having thereon a joining start point and a joining finish point, the method comprising the steps of inserting the joining tool into the second member after the joining tool is positioned to confront the joining start point on the joining line; backward-moving the joining tool a predetermined distance along the joining line in a direction opposite the joining finish point; causing the joining tool to turn back at a turning-back point spaced the predetermined distance from the joining start point; forward-moving the joining tool along the joining line as far as the joining finish point past the joining start point; and pulling the joining tool out from the second member at the joining finish point.

In the inventive method described above, the joining tool is reciprocated between the joining start point and the turning-back point positioned oppositely from the joining finish point. By thus reciprocating the joining tool pin portion rotating at a high speed, partial platings and coatings softened and scratched off by a first travel backward of the pin portion are whirled up and dispersed in molten metal by a second travel forward of the pin portion. As a result, the problem of fracture in the interface is overcome.

It is preferred that the first member be a galvanized steel sheet, the base metal be a steel sheet, and the substance different from the base metal be a plated layer. The plated layer is hard and hence is difficult to effect dispersion at the vicinity of the joining start point by common friction-stir joining. This becomes possible by reciprocation of the joining tool as explained above.

Desirably, the predetermined distance is 0.75-1.5 times an external diameter of a pin portion of the joining tool. The predetermined distance smaller than 0.75 times may leave an insufficiently stirred region. Since the turning-back portion is to be cut off, the predetermined distance larger than 1.5 times will lead to deteriorated yields. With this in view, it is desirable that the upper limit is 1.5 times.

BRIEF DESCRIPTION OF THE DRAWINGS

A preferred embodiment of the present invention will be described in detail with reference to the accompanying drawings, in which:

FIGS. 4A-4C illustrate an inserting step through a backward-moving step of a friction-stir joining method according to the present invention, wherein FIG. 4A shows an aluminum alloy sheet placed on a galvanized steel sheet, followed by positioning a joining tool above a joining start point of the aluminum alloy sheet in opposed relation to the latter; FIG. 4B shows a pin portion of the joining tool inserted through the aluminum alloy sheet until its tip comes to an interface or a joining surface of the galvanized steel sheet; and FIG. 4C shows shifting of the joining tool leftwardly by a predetermined distance;

FIGS. 5A-5C illustrate a turning-back step through an up-pulling step of the friction-stir joining method, wherein FIG. 5A shows scratching and scrapping off of a plated layer and a cationic electrodeposition layer between the joining start point and the turning-back point by the pin portion as the joining tool arrives at the turning back point; FIG. 5B shows a forward-moving step, in which the joining tool is moved from the turning-back point as far as the joining start point; and FIG. 5C shows the friction-stir joined member;

FIGS. 6A-6B illustrate in cross-section test materials A and B, wherein FIG. 6A shows sample material A according to a comparative example; and FIG. 6B shows sample material B according to the present invention.

DETAILED DESCRIPTION OF THE INVENTION

Figure 1:
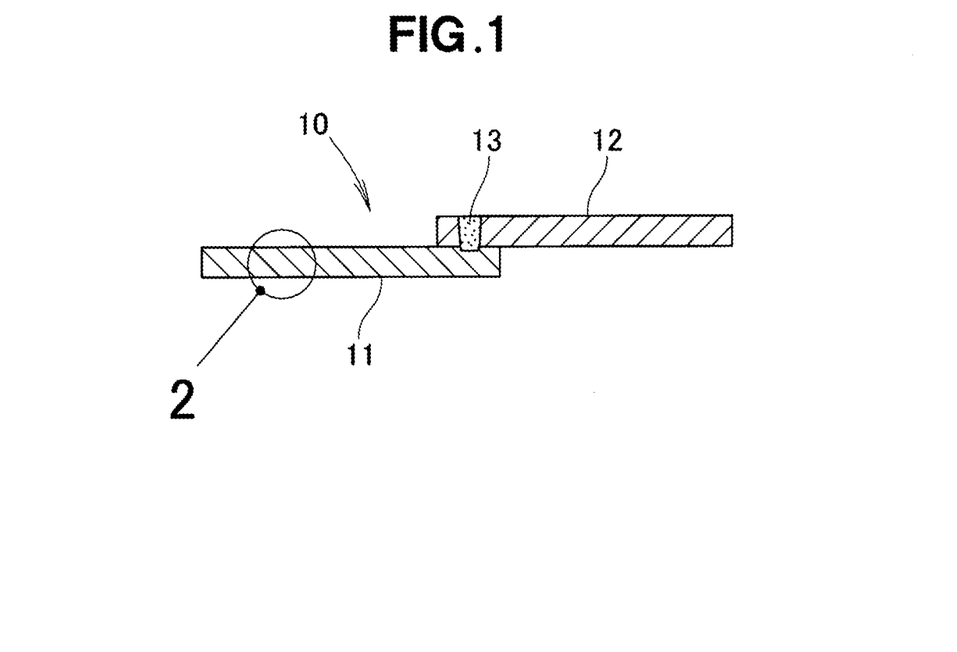
FIG. 1 is a cross-sectional view showing a friction-stir-joined workpiece manufactured in accordance with the present invention.

Referring now to FIG. 1, a friction-stir joined member 10 produced in accordance with the inventive friction-stir joining method is comprised of a first member 11, a second member 12 and a bead 13 that joins the first and second members 11, 12 together.

The first member 11 may be, for example, an alloyed hot-dip galvanized steel sheet (hereinafter referred to as "galvanized steel sheet"). The second member 12 may be, for example, an aluminum alloy sheet. The aluminum alloy sheet may be, for example, an ADC3-T5 material having a thickness of 3.0 mm. The second member 12 will hereinafter be referred to as an aluminum alloy sheet 12.

Figure 2:
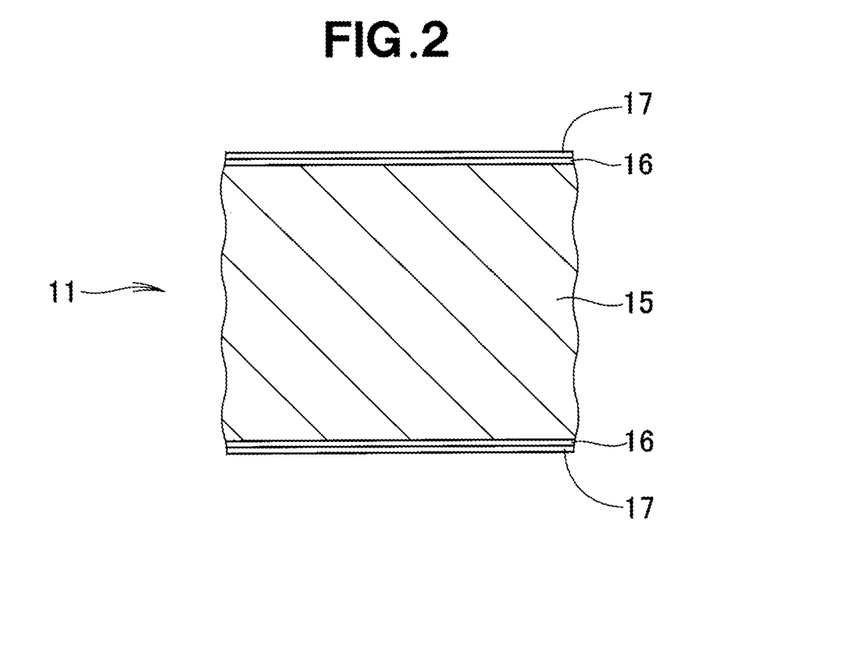
FIG. 2 is an enlarged view showing encircle region 2 of FIG. 1.

As shown in FIG. 2, the galvanized steel sheet 11 may be, for example, one in a class of 270 MPa and is comprised of a steel sheet 15 as a base metal, a plated layer (deposit) 16 obtained through a hot-dip galvanization process and covering the steel sheet 15, and a cationic electrodeposition layer 17 covering the plated layer 17. The galvanized steel sheet 11 has, for example, a thickness of 2.0 mm. The plated layer 16 has a thickness of 5-6 μm while the cationic electrodeposition layer 17 has a thickness of 20 μm (upper limit).

Figure 3:
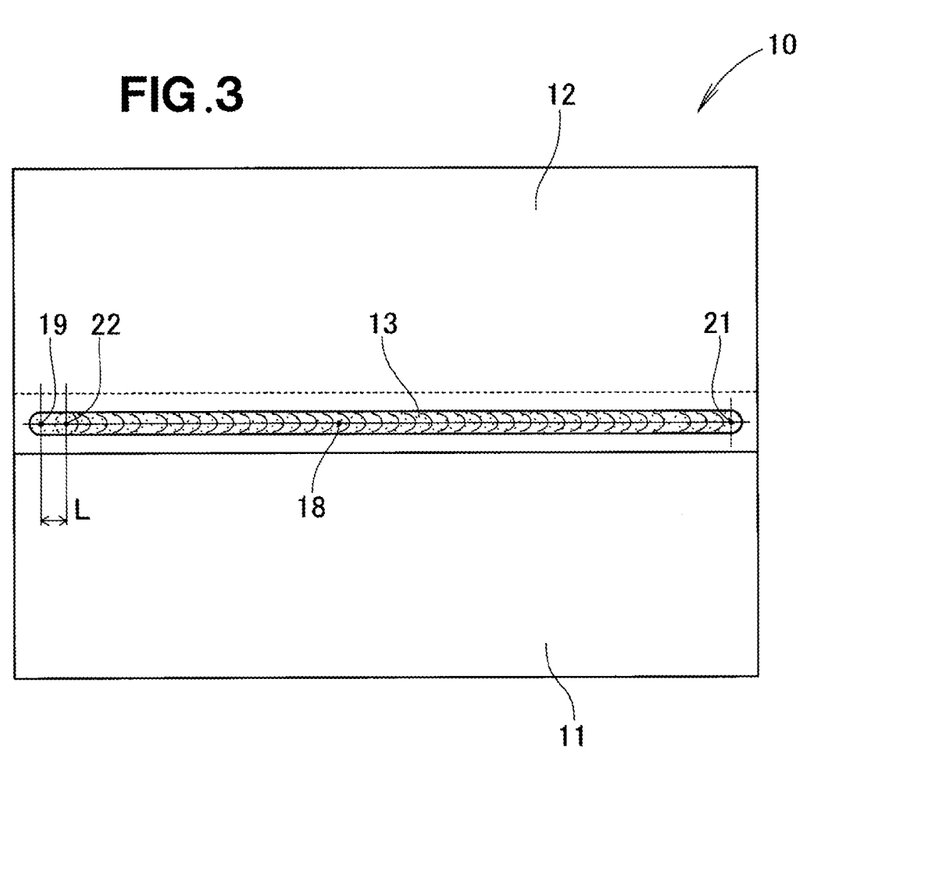
FIG. 3 is a top plan view showing the friction-stir-joined workpiece.

Turning now to FIG. 3, the bead 13 extends along a joining (welding) line 18, which in turn extends between a turning-back (retracing) point 19 and a joining finish point (terminus) 21. A joining start point or origin 22 is positioned partway on the joining line 18 and spaced a predetermined distance L from the turning-back point 19.

Figure 4A:
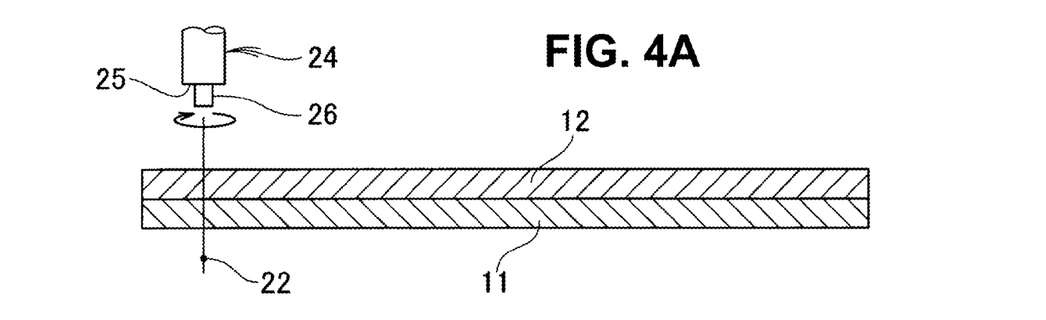
Figure 4B:
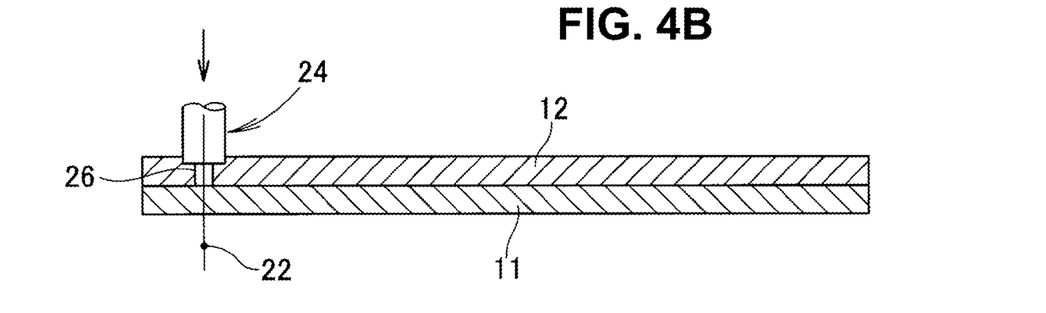
Figure 4C:
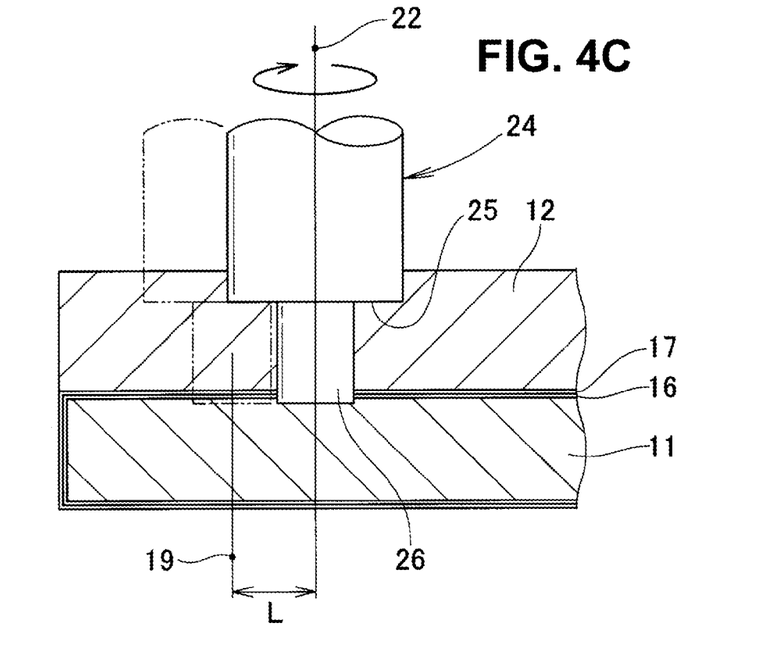

Referring now to FIGS. 4A-4C, discussion will be made as to the method of manufacturing the friction-stir joined member 10. As shown in FIG. 4A, the aluminum alloy sheet 12 is placed on the galvanized steel sheet 11, followed by positioning a joining tool 24 above the joining start point 22 of the aluminum alloy sheet 12 in opposed relation to the latter. The joining tool 24 includes a shoulder portion 25 and a pin portion 26. The pin portion 26 has an external diameter of 7.2 mm and a length of 3.1 mm.

As shown in FIG. 4B, the pin portion 26 of the joining tool 24, while rotating at a high speed, is inserted through the aluminum alloy sheet 12 until its tip comes to an interface or a joining surface of the galvanized steel sheet 11 (inserting step).

Then, the joining tool 24 is shifted leftwardly by a distance L, as shown in FIG. 4C. The distance L may desirably be 8 mm which is equivalent to the external diameter 7.2 mm of the pin portion 26. That is, the joining tool 24 is moved backward from the joining start point 22 as far as the turning-back point 19 (backward-moving step).

Figure 5A:
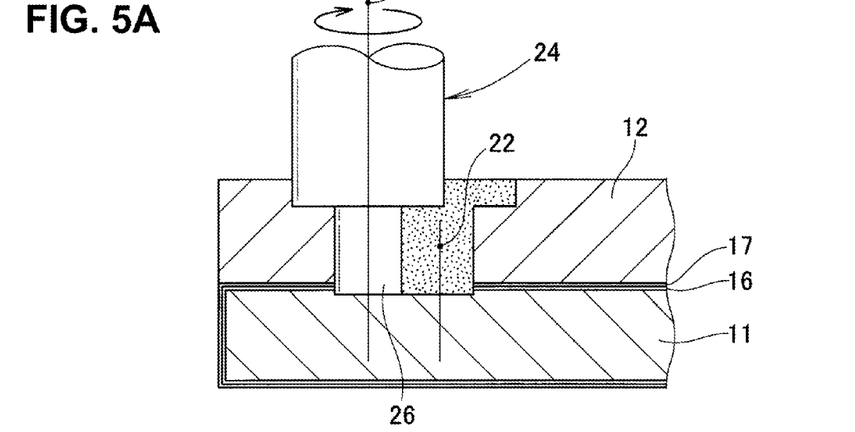

As the joining tool 24 arrives at the turning-back point 19, as shown in FIG. 5A, the plated layer 16 and the cationic electrodeposition layer 17 between the joining start point 22 and the turning-back point 19 are scratched and scraped off by the pin portion 26 rotating at a high speed. As the pin portion 26 is moved laterally, the cationic electrodeposition layer 17 and the plated layer 16 are scratched and effectively scraped off by the pin portion tip oriented in the direction of advancing movement. In contrast, because, in the inserting step, the pin is merely inserted from above against the joining start point 22 and not moved laterally to scratch and scrape off the scratched layers 16, 17 with the advancing-direction-oriented tip of the pin portion 26, a relatively large amount of scratched layers are considered to remain in the vicinity of the joining start point 22, namely, in a joining interface (between the galvanized steel sheet 11 and the aluminum alloy sheet 12).

At the turning-back point 19, the joining tool 24 is switched from a backward-moving mode to a forward-moving mode (turning-back step).

Figure 5B:
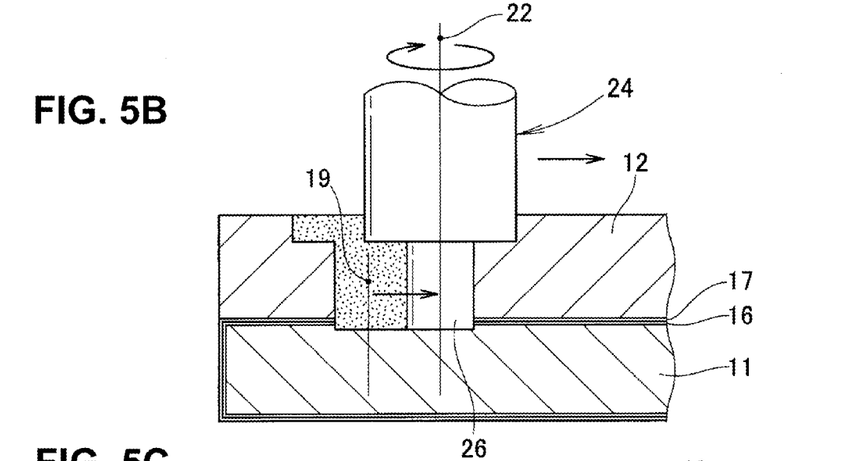

Continuously, the joining tool 24 is moved forward (forward-moving step), as shown in FIG. 5B. In the forward-moving step, the joining tool 24 is moved from the turning-back point 19 as far as the joining start point 22. The scratched plated layer 16 and cationic electrodeposition layer 17 remaining at the interface in the vicinity of the joining start point 22 are stirred anew by the pin portion 26. This stir causes the plated layer 16 and the cationic electrodeposition layer 17 in the vicinity of the interface to be stirred into a molten metal and dispersed within the latter. The joining tool 24 is continuously advanced without being stopped at the joining start point 22.

Figure 5C:
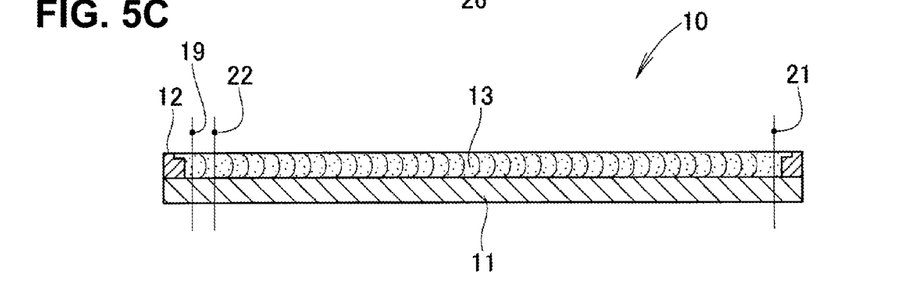

At the joining finish point 21, the joining tool 24 is pulled out upward (up-pulling step). As a result, the friction-stir joined member 10 is obtained, as shown in FIG. 5C.

To confirm the effectiveness of the backward-moving step, the turning-back step and the forward-moving step according to the present invention, the inventors hereof have carried out an experiment as explained below.

(Experiment)

Discussion will now be made as to the experiment, which is an example only and should not be construed as limiting the present invention.

(Sample Materials)

Figure 6A:
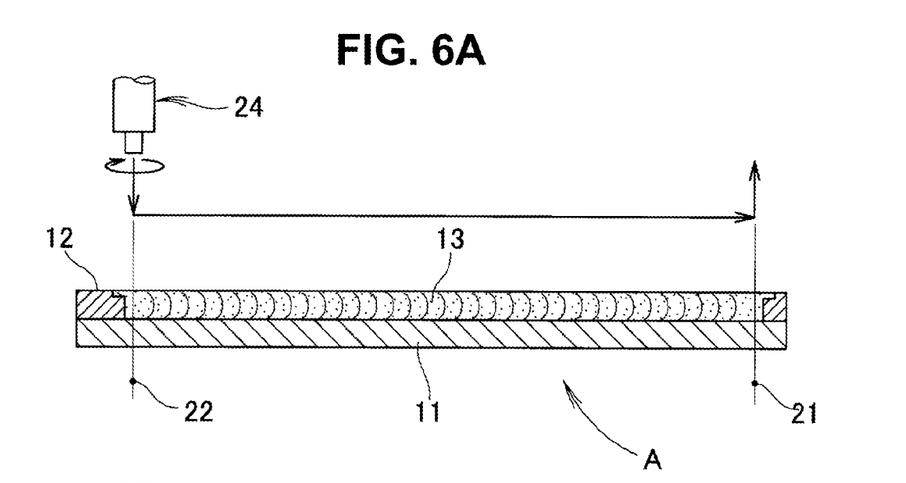
Figure 6B:
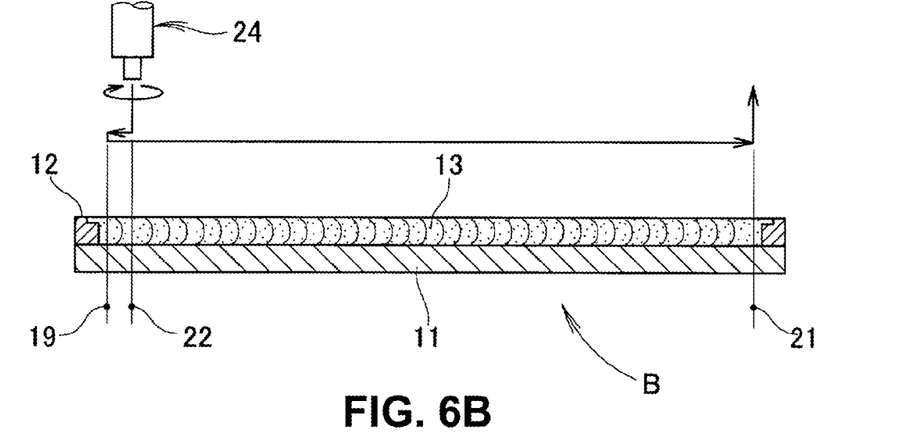

Two different kinds of sample materials A and B as shown in FIGS. 6A and 6B have been readied for the experiment. Sample material A of FIG. 6A serves as a comparative example and was obtained by inserting the joining tool 24 as deep as the joining start point 22 (inserting step), forward-moving the joining tool 24 (forward-moving step), and up-pulling the joining tool 24 at the joining finish point 21 (up-pulling step).

Sample material B of FIG. 6B is one according to the embodiment of the present invention and thus obtained by inserting the joining tool 24 as deep as the joining start point 22 (inserting step), moving the joining tool 24 backward as far as the turning-back point 19 (backward-moving step), causing the joining tool 24 to turn back for forward movement at the turning-back point 19 (turning-back step), moving the joining tool 24 forward as far as the joining finish point 21 (forward-moving step), and pulling the joining tool 24 up at the joining finish point 21 (up-pulling step).

Friction-stir joining has been applied to both sample materials A and B on the same conditions (joining tool rotation speed: 1,000 rpm; joining tool moving speed: 500 mm/min).

(Test Pieces Made from Sample Material A)

Eight test pieces have been obtained by cutting sample material A into widths of 25 mm with the joining start point included midway. Friction stir joining was carried out with respect to each piece, namely, eight times, on the same conditions.

(Test Pieces Made From Sample Material B)

Eight test pieces have been obtained by cutting sample material B into widths of 25 mm with the joining start point included midway. Friction stir joining was carried out with respect to each piece, namely, eight times, on the same conditions.

(Tensile Strength Test On Test Pieces Obtained From Sample Materials A and B)

Each thus-obtained test piece (T.P.) was placed on a tensile text machine so as to measure its tensile strength. Measured values are shown not in Pa (Pascal) but in N (Newton) per W=25 mm. The measurements are as shown in Table 1 below.

TABLE 1

| | T.P. | Tensile Strength | Maximum | Minimum | Average |
|---|---|---|---|---|---|
| Sample Material A | 1 | 6793 (N) | | | |
| | 2 | 5916 (N) | | →5916 (N) | |
| | 3 | 6753 (N) | | | |
| | 4 | 6587 (N) | | | 6693 (N) |
| | 5 | 6849 (N) | | | |

TABLE 1-continued

|  | T.P. | Tensile Strength | Maximum | Minimum | Average |
|---|---|---|---|---|---|
|  | 6 | 7333 (N) | →7333 (N) |  |  |
|  | 7 | 6611 (N) |  |  |  |
|  | 8 | 6699 (N) |  |  |  |
| Sample | 1 | 8376 (N) |  | →8376 (N) |  |
| Material B | 2 | 9201 (N) |  |  |  |
|  | 3 | 8451 (N) |  |  |  |
|  | 4 | 9268 (N) | →9268 (N) |  | 8807 (N) |
|  | 5 | 9138 (N) |  |  |  |
|  | 6 | 8447 (N) |  |  |  |
|  | 7 | 9076 (N) |  |  |  |
|  | 8 | 8502 (N) |  |  |  |

Among the tensile strengths of test pieces (T.P.) 1-8 of sample material A, the maximum is 7333 N while the minimum is 5916 N, the average being 6693 N. In contrast, among the tensile strengths of text pieces 1-8 of sample material B, the maximum is 9268 N while the minimum is 8376 N, the average being 8807 N.

Figure 7:
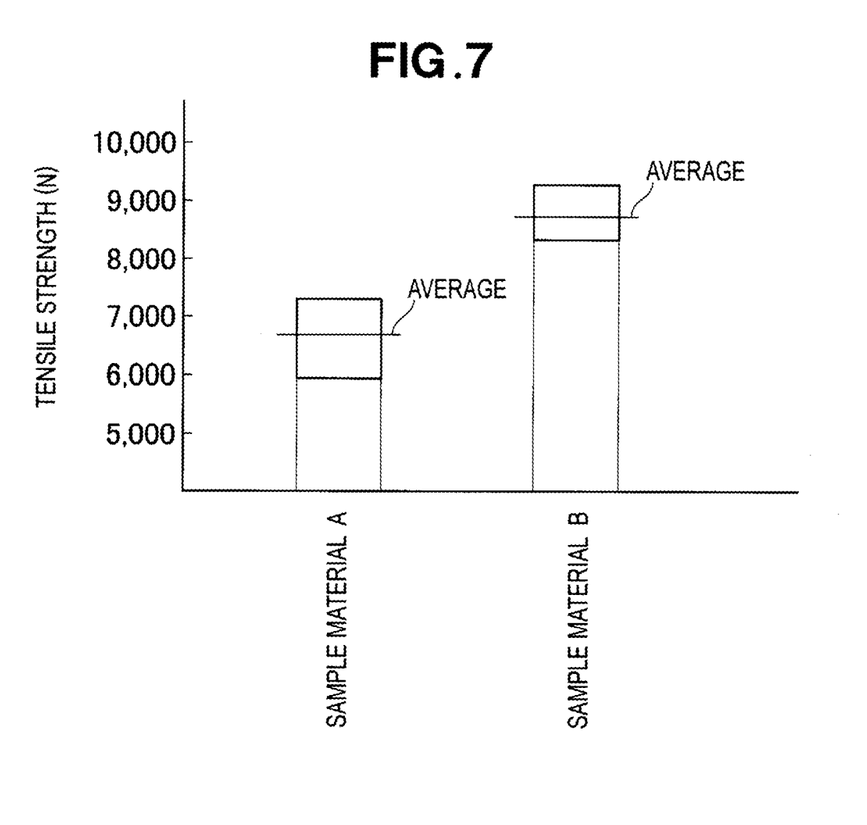
FIG. 7 is a graph showing tensile strengths of test materials A and B.

As can be readily appreciated from FIG. 7, sample material A exhibits widely varying measurements of tensile strength and a small average. In contrast, sample material B exhibits measurements not varying as those of sample material A and an average value larger than that of the latter.

It should also be noted that factures in test pieces 1-8 of sample material A were found in the interface while fractures in test pieces 1-8 of sample material B were found in TMAZ (Thermo-Mechanically Affected Zone), which is in a region proximate to the base metal.

It can be speculated from the above that in sample material A (FIG. 6A), scratched-off parts of the plated layer remain in the interface, thereby causing the fractures in the interface. In contrast, in the present invention, partial platings and coatings softened and scratched off by a first travel backward of the pin portion are whirled up and dispersed in molten metal by a second travel forward of the pin portion. As a result, it is assumed that the problem of fracture in the interface is overcome now.

It should additionally be noted that other than the galvanized metal sheet, the first member may be a coated steel sheet, an oxide-layer coated steel sheet or one of any other similar steel sheets. Other than the aluminum alloy sheet, the second member may be one of any other metal sheets.

The present invention particularly suitable for use in a friction-stir joining method for joining together a galvanized steel sheet and an aluminum alloy sheet.

Obviously, various minor changes and modifications of the present invention are possible in light of the above teaching. It is therefore to be understood that within the scope of the appended claims the invention may be practiced otherwise than as specifically described above.

What is claimed is:

1. A friction-stir joining method for joining a first member having a base metal covered with a substance different from the base metal, with a second member after the second member is placed on the first member by moving a joining tool along a joining line having thereon a joining start point and a joining finish point, the method comprising the steps of:

inserting a portion of the joining tool into the second member after the joining tool is positioned to confront the joining start point on the joining line;

backward-moving the joining tool a predetermined distance along the joining line in a direction opposite the joining finish point to thereby cause the substance on the base metal to be scratched off by the tip of the pin portion while allowing the scratched substance to remain at the interface in the vicinity of the joining start point;

causing the joining tool to turn back at a turning-back point spaced the predetermined distance from the joining start point;

forward-moving the joining tool along the joining line as far as the joining finish point past the joining start point to thereby cause the scratched substance remaining at the interface in the vicinity of the joining point to be stirred by the joining tool and dispersed into a molten metal; and pulling the joining tool out from the second member at the joining finish point, wherein the first member is a galvanized steel sheet, the base metal is a steel sheet, and the substance different from the base metal is a plated layer, and wherein the predetermined distance is 0.75-1.5 times an external diameter of a pin portion of the joining tool.

2. A friction-stir joining method for joining a first member having a base metal covered with a substance different from the base metal, with a second member after the second member is placed on the first member by moving a joining tool, while rotating at a high speed, along a joining line having thereon a joining start point and a joining finish point, the method comprising the steps of:

inserting a pin portion of the joining tool into the second member until a tip of the pin portion comes to an interface of the first member after the joining tool is positioned to confront the joining start point on the joining line;

backward-moving the pin portion of the joining tool a predetermined distance along the joining line in a direction opposite the joining finish point to thereby cause the substance on the base metal to be scratched off by the tip of the pin portion while allowing the scratched substance to remain at the interface in the vicinity of the joining start point;

causing the pin portion of the joining tool to turn back at a turning-back point on the joining line, the turning-back point being spaced the predetermined distance from the joining start point;

forward-moving the pin portion of the joining tool along the joining line as far as the joining finish point past the joining start point to thereby cause the scratched substance remaining at the interface in the vicinity of the joining start point to be stirred by the pin portion and dispersed into a molten metal; and pulling the pin portion of the joining tool out from the second member at the joining finish point.

3. The method according to claim 2, wherein the first member is a galvanized steel sheet, the base metal is a steel sheet, and the substance different from the base metal is a plated layer.

4. The method according to claim 2, wherein the predetermined distance is 0.75-1.5 times an external diameter of the pin portion of the joining tool.

* * * * *